(12) United States Patent
    Licona et al.

(10) Patent No.: US 8,930,781 B2
(45) Date of Patent: Jan. 6, 2015

(54) METHOD AND APPARATUS FOR DEFECT RECOVERY

(75) Inventors: Estuardo Licona, Milpitas, CA (US); Mats Oberg, Cupertino, CA (US)

(73) Assignee: Marvell World Trade Ltd., St. Michael (BB)

( * ) Notice: Subject to any disclaimer, the term of this patent is extended or adjusted under 35 U.S.C. 154(b) by 434 days.

(21) Appl. No.: 13/301,199

(22) Filed: Nov. 21, 2011

(65) Prior Publication Data

US 2012/0131405 A1    May 24, 2012

Related U.S. Application Data

(60) Provisional application No. 61/416,167, filed on Nov. 22, 2010.

(51) Int. Cl.
    G11C 29/00    (2006.01)
    G11B 20/10    (2006.01)
    G11B 27/36    (2006.01)
    G11B 20/18    (2006.01)

(52) U.S. Cl.
    CPC .... *G11B 20/10009* (2013.01); *G11B 20/10027* (2013.01); *G11B 20/10222* (2013.01); *G11B 20/1037* (2013.01); *G11B 20/10435* (2013.01); *G11B 20/10481* (2013.01); *G11B 27/36* (2013.01); *G11B 2020/1823* (2013.01); *G11B 2220/2537* (2013.01)
    USPC .......................................... 714/721; 714/746

(58) Field of Classification Search
    CPC ....................................................... G11C 29/00
    USPC .................... 714/721, 733, 746, 11
    See application file for complete search history.

(56) References Cited

U.S. PATENT DOCUMENTS

| 3,749,823 | A  | * | 7/1973  | Warner | ............................. 348/32 |
| 4,403,286 | A  | * | 9/1983  | Fry et al. | ......................... 718/105 |
| 6,141,169 | A  |   | 10/2000 | Pietruszynski et al. | |
| 6,986,073 | B2 | * | 1/2006  | Liu | ............................... 713/600 |
| 7,788,067 | B2 | * | 8/2010  | Bachalo et al. | ................. 702/193 |

(Continued)

FOREIGN PATENT DOCUMENTS

| EP | 1 365 402 A2 | 11/2003 |
| EP | 1 524 661 A1 | 4/2005 |

OTHER PUBLICATIONS

International Search Report and Written Opinion of the International Searching Authority, mailed Mar. 9, 2012 in counterpart International Application No. PCT/US2011/061665.

*Primary Examiner* — Fritz Alphonse

(57) ABSTRACT

A signal processing circuit includes a plurality of processing-circuit modules and a logic control circuit. The plurality of processing-circuit modules is configured to process an electrical signal. The plurality of processing-circuit modules has at least one processing parameter that is adaptively adjusted based on the electrical signal. The logic control circuit is configured to receive signals from the plurality of processing-circuit modules, validate the processing based on the received signals, and control a storage circuit to sample and store a value of the processing parameter when the processing is validated. Further, the logic control circuit is configured to control the storage circuit to maintain the value of processing parameter when the processing fails validation, and to control the storage circuit to recover the processing parameter in the plurality of processing-circuit modules to the stored value when the plurality of processing-circuit modules is disturbed by a defect.

21 Claims, 4 Drawing Sheets

(56) References Cited

U.S. PATENT DOCUMENTS

| | | | |
|---|---|---|---|
| 8,218,804 B2* | 7/2012 | Sacha et al. | 381/328 |
| 8,593,856 B2* | 11/2013 | Koyama et al. | 365/149 |
| 2005/0117484 A1 | 6/2005 | Tatsuzawa et al. | |
| 2006/0280240 A1 | 12/2006 | Kikugawa et al. | |
| 2008/0262643 A1 | 10/2008 | Creigh et al. | |
| 2009/0003169 A1 | 1/2009 | Chiba et al. | |
| 2012/0044372 A1* | 2/2012 | Cote et al. | 348/218.1 |

\* cited by examiner

METHOD AND APPARATUS FOR DEFECT RECOVERY

INCORPORATION BY REFERENCE

This application claims the benefit of U.S. Provisional Application No. 61/416,167, "Saving Accumulator Values to Speed Up Defect Recovery" filed on Nov. 22, 2010, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Storage medium, such as an optical disc, and the like, may have defects, such as scratches, fingerprints, and the like. A medium apparatus that reads and/or writes the storage medium may have defect recovery capability to achieve robust medium processing, and minimize data corruption.

SUMMARY

Aspects of the disclosure provide a signal processing circuit. The signal processing circuit includes a plurality of processing-circuit modules and a logic control circuit. The plurality of processing-circuit modules is configured to process an electrical signal that is generated in response to reading data on a storage medium. The plurality of processing-circuit modules has at least one processing parameter that is adaptively adjusted based on the electrical signal. The logic control circuit is configured to receive signals from the plurality of processing-circuit modules, validate the processing based on the received signals, and control a storage circuit to sample and store a value of the processing parameter when the processing is validated. Further, the logic control circuit is configured to control the storage circuit to maintain the value of processing parameter when the processing fails validation, and to control the storage circuit to recover the processing parameter in the plurality of processing-circuit modules to the stored value when the plurality of processing-circuit modules is disturbed by a defect.

According to an aspect of the disclosure, the logic control circuit is configured to control the storage circuit to sample the processing parameter at a relatively high frequency, such as a frequency that is higher than a threshold, when the processing is validated. In an embodiment, the logic control circuit is configured to control the storage circuit to sample the processing parameter at each frame sync interval when the processing is validated. In an example, the logic control circuit is configured to validate the processing based on at least one of a signal indicative of frame sync mark detection, a signal indicative of an error rate of the plurality of processing-circuit modules and a signal indicative of defect detection.

In another embodiment, the logic control circuit is configured to control the storage circuit to sample the processing parameter at each sector sync interval when the processing status is validated. In an example, the logic control circuit is configured to validate the processing based on at least one of a signal indicative of sector sync mark detection, a signal indicative of sector sync mark identification detection, a signal indicative of an error rate of the plurality of processing-circuit modules and a signal indicative of defect detection.

In another embodiment, the logic control circuit is configured to control the storage circuit to sample the processing parameter at angle index interval when the processing status is validated. In an example, the logic control circuit is configured to validate the processing based on a signal indicative of an error rate of the plurality of processing-circuit modules.

According to an embodiment of the disclosure, the plurality of processing-circuit modules includes a control loop configured to adjust the processing parameter to control an attribute of the processed electrical signal. The logic control circuit is configured to control the storage circuit to sample an accumulator of the control loop when the processing is validated. For example, the plurality of processing-circuit modules includes at least one of an offset loop configured to adjust an offset adjustment to control an offset of the processed electrical signal, a gain loop configured to adjust a gain for amplifying the electrical signal to control an amplitude of the processed electrical signal, and a timing loop configured to adjust a sampling clock to control timing of the sampled electrical signal.

Aspects of the disclosure provide a method for signal processing. The method includes receiving signals generated during processing of an electrical signal that is generated in response to reading data on a storage medium, validating the processing based on the received signals, sampling a processing parameter that is adaptively adjusted based on the electrical signal when the processing is validated, and storing the sampled value of the processing parameter. Further, the method includes maintaining the stored value when the processing fails validation, and recovering the processing parameter to the stored value when a defect is detected.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
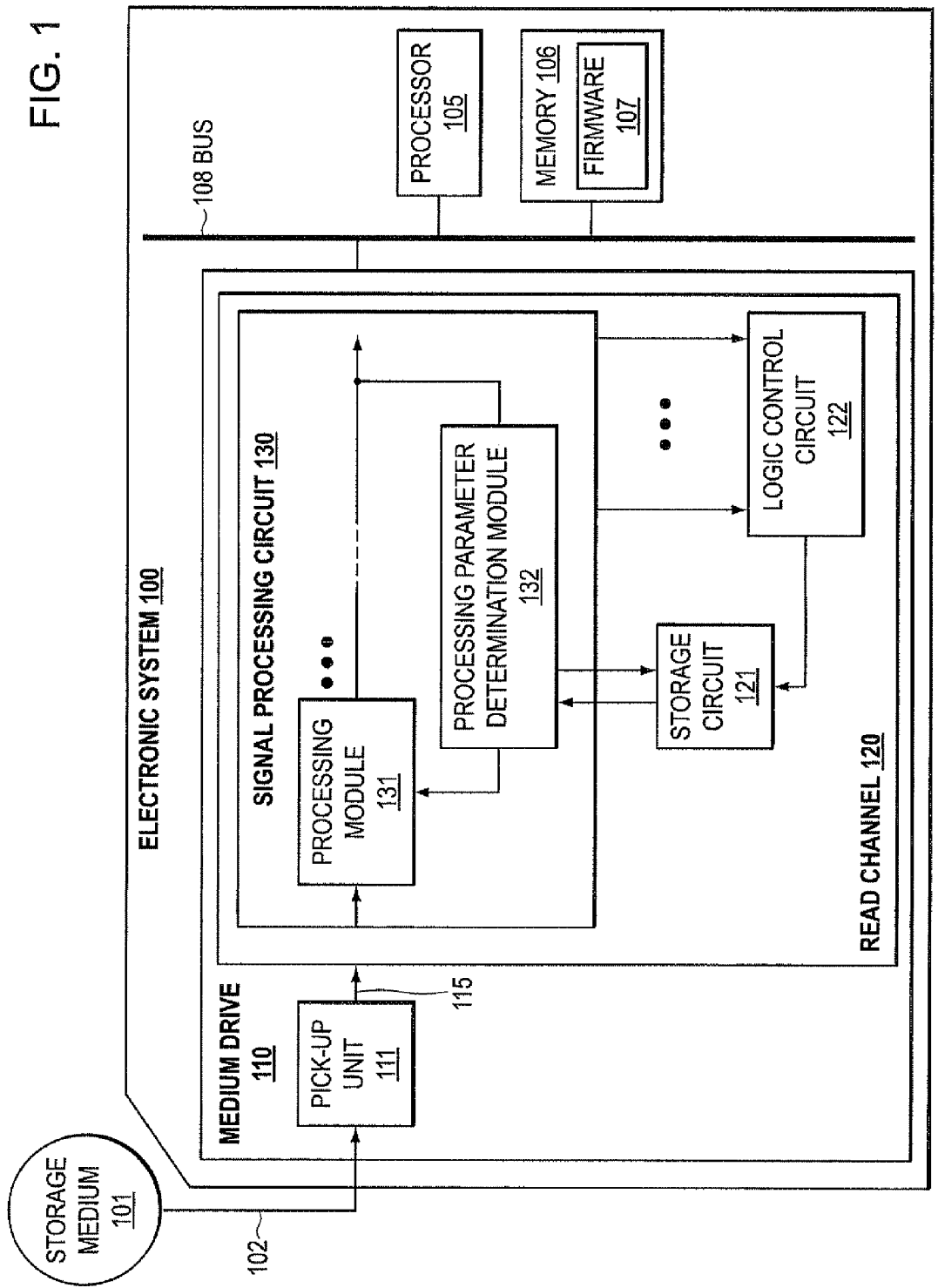
FIG. 1 shows a block diagram of an electronic system example 100 according to an embodiment of the disclosure.

FIG. 1 shows a block diagram of an electronic system example 100 and a storage medium example 101 according to an embodiment of the disclosure. The electronic system 100 receives a signal 102 corresponding to information stored on the storage medium 101. The electronic system 100 processes the signal 102 and extracts the information from the signal 102. The electronic system 100 includes various components, such as a processor 105, a medium drive 110, and a memory 106, and the like. These elements are coupled together, for example, via a bus 108, as shown in FIG. 1.

The medium drive 110 includes a pickup unit 111 and a read channel 120. The pick-up unit 120 receives the signal 102 and suitably generates an electrical signal 115 in response to the signal 102. The read channel 120 processes the electrical signal 115, and extracts a bit stream from the electrical signal 115.

It is noted that the signal 102 can be any suitable signal. In an embodiment, the signal 102 is generated in response to a bit stream stored on the storage medium 101. It is noted that the storage medium 101 can be any suitable storage medium. In an example, the storage medium 101 is a hard disk that stores the bit stream as magnetic field changes. The pick-up unit 111 includes a magnetic head that generates the electrical signal 115 in response to the magnetic field changes on the storage medium 101. The read channel 120 processes the electrical signal 115 and extracts the bit stream from the electrical signal 115.

In another example, the storage medium 101 is an optical disc, such as compact disc (CD), digital versatile disc (DVD), Blu-ray disc, and the like, that stores the bit stream as optical property changes. The pick-up unit 111 is an optical pick-up unit that generates the electrical signal 115 in response to the optical property changes. Specifically, the pick-up unit 111 directs a light beam to the storage medium 101. The light beam is reflected from the storage medium 101. The signal 102, which is the reflected light beam, has light properties that correspond to the optical property changes on the storage medium 101. The pick-up unit 111 generates the electrical signal 115 in response to the light properties of the signal 102. The read channel 120 processes the electrical signal 115 and extracts the bit stream from the electrical signal 115.

In another embodiment, the signal 102 is an electromagnetic signal transmitted in the air, for example, from a base station (not shown). The pick-up unit 111 includes an antenna that suitably generates the electrical signal 115 in response to the electromagnetic signal 102. The read channel 120 processes the electrical signal 115 and extracts the bit stream from the electrical signal 115.

The read channel 120 includes a signal processing circuit 130, a storage circuit 121, and a logic control circuit 122. The signal processing circuit 130 receives the electrical signal 115 and processes the electrical signal 115. The electrical signal 115 may have variable properties due to various reasons. In an example, the electrical signal 115 has variable offset and variable amplitude. The offset and the amplitude may vary due to various reasons, such as a power variation of the laser beam, a reflectivity variation of the optical disc 119, and the like. Generally, the signal processing circuit 130 includes control circuit module to process the electrical signal 115 to maintain the processed electrical signal having relatively stable properties. In an example, the signal processing circuit 130 includes various control loops, such as an offset control loop, a gain control loop, and the like, that are locked to the electrical signal to adaptively adjust processing parameters in the signal processing circuit 130 based on the electrical signal, such that the properties of the processed electrical signal are maintained at a desired level(s) to facilitate further signal processing.

In an example, the signal processing circuit 130 includes an offset control loop that adaptively adjusts an offset adjustment added to the electrical signal 115 to compensate for the offset variation, such that the offset of the adjusted electrical signal is maintained at a desired level, such as at about zero. In another example, the signal processing circuit 130 includes a gain control loop that adaptively adjusts a gain of an amplifier that amplifies the electrical signal to compensate for the amplitude variation, such that the amplitude of the amplified electrical signal is maintained at a desired level.

It is noted that the offset and the amplitude of the electrical signal are not necessarily maintained at relatively constant values. Instead, the offset and the amplitude of the electrical signal are maintained at desired levels, such as within a range, and the like.

According to an embodiment of the disclosure, a control loop includes various processing modules 131, and a processing parameter determination module 132 coupled together. The processing parameter determination module 132 determines the processing parameters, such as an offset adjustment, a gain adjustment, a timing adjustment, and the like, for processing the electrical signal 115, and at least one of the processing modules 131 performs signal processing according to the processing parameters. In the FIG. 1 example, the processing modules 131 and the processing parameter determination module 132 are coupled together in a feedback control loop. It is noted that, in another example, the processing parameter determination module 132 is suitably coupled to the processing module 131 in a feed forward manner (not shown).

The storage circuit 121 is configured to receive control signals from the logic control circuit 122, and operate based on the control signals. In an embodiment, the storage circuit 121 is configured to perform a sampling operation, a maintaining operation, and a recovering operation in response to the control signals. During the sampling operation, the storage circuit 121 samples the determined processing parameters by the processing parameter determination module 132, and stores the sampled values. During the maintaining operation, the storage circuit 121 maintains the stored values. During the recovering operation, the storage circuit 121 provides the stored values to the processing parameter determination module 132 to recover the processing parameters. In an example, the storage circuit 121 includes registers configured to perform the sampling operation, the maintaining operation and the recovering operation in response to the control signals.

The logic control circuit 122 receives signals from the signal processing circuit 130, performs logic operations based on the signals from the signal processing circuit 130 to generate the control signals, and provides the control signals to control the operations of the storage circuit 121. According to an aspect of the disclosure, the signals from the signal processing circuit 130 are generated from hardware, such as digital and analog circuit, and the logic control circuit 122 generates the control signals using hardware, such as digital and analog circuit, thus the controls signals can be generated at a relatively high frequency, and the storage circuit 121 can perform operations on the processing parameters in the signal processing circuit 130 at a relatively high frequency.

According to an aspect of the disclosure, the electrical signal 115 can be affected by various defects, such as scratches, fingerprints, and the like present on the storage medium 101. Some defects, such as scratches, can significantly affect the control loops in signal processing circuit 130. In an example, scratches may cause the control loops to lose lock to the electrical signal. Further, it may take a relatively long time for the control loops to adaptively re-lock to the electrical signal, and thus data corruption may exist beyond the scratches. In another example, the control loops are still locked to the electrical signal to track the property of the electrical signal over a defect area, but the tracked property has significant value change compared to a defect free area. Then, it may take a relatively long time for the control loops to adaptively recover and restore the appropriate value when the defect area is passed.

According to the disclosure, the read channel 120 is configured to reduce data corruption due to the defects on the storage medium 101. Specifically, the logic control circuit 122 receives various signals during the signal processing. Based on the received signals, the logic control circuit 122 validates the processing performed by the signal processing circuit 130. Based on the validation, the logic control circuit 122 provides control signals to the storage circuit 121. For example, when the defect disturbance is at relatively low level, based on the signals from the signal processing circuit 130, the logic control circuit 122 validates the processing of the electrical signal 115 by the signal processing circuit 130. Then, the logic control circuit 122 provides the control signals to control the storage circuit 121 to perform the sampling operation.

When the defect disturbance is at relatively high level, the signal processing circuit 130 may be disturbed. For example, the control loops may temporally lose lock to the electrical signal, and the processing parameters are bounded at predetermined limits. Based on the signals from signal processing circuit 130, the logic control circuit 122 determines that the processing is disturbed and fails validation. The logic control circuit 122 controls the storage circuit 121 to perform the maintaining operation.

Further, based on the signals from the signal processing circuit 130, the logic control circuit 122 can determine an end of defect. Then, the logic control circuit 122 controls the storage circuit 121 to perform the recovering operation.

According to another aspect of the disclosure, because the control signals to the storage circuits 121 are generated by hardware circuits, such as the logic control circuit 122, and are based on signals from hardware circuits, such as signals from the signal processing circuit 130 during signal processing, the hardware based control signals can be generated with relatively high frequency, and relatively small delay to the property changes of the electrical signal 115 due to the defect disturbance. Thus, the operations of the storage circuit 121 have a relatively fine time resolution, and can correspond to the property change of the electrical signal 115 with relatively small delay. For example, the storage circuit 121 can sample and store the processing parameters with a relatively high frequency, thus the storage circuit 121 stores the relatively recent values of the processing parameters before a defect disturbance. Further, with a relatively small delay to the end of the defect, the storage circuit 121 can use the relatively recent values of the processing parameters to recover the processing parameters for the processing module 131, thus the recovery after the defect speeds up, and data corruption is minimized.

It is noted that, in an embodiment, the bit stream extracted from the electrical signal 115 is further processed by the electronic system 100 to determine the control signals to the storage circuit 121. In an example, the processor 105 executes code instructions, such as firmware 107 stored in the memory 106, to further process the bit stream, and generate software based control signals based on the bit stream to control the operations of the storage circuit 121. Because it takes the processor relatively long time to execute the firmware 107 to generate the software based control signals, the control signals generated by the processor 105 have relatively low frequency and relatively long delay to the property changes of the electrical signal 115 due to the defect disturbance compared to the control signals generated by the logic control circuit 122.

According to an aspect of the disclosure, the signal processing circuit 130 can be implemented with relatively large loop gains to increase data recovery capability from soft defects, such as fingerprint defects, and the like, without negatively affecting recovery from hard defects, such as scratch defects. Generally, disturbance due to scratch defects has a frequency equivalent to the disc run-out frequency. In an embodiment, the control signals from the logic control circuit 122 control the storage circuit 121 to sample the processing parameters at a much higher frequency than the disc run-out frequency, such as eight times of the disc run-out frequency or higher. When a scratch defect disturbs the electrical signal 115, the processing parameters before the disturbance is suitably stored to recover the signal processing after the disturbance.

According to another aspect of the disclosure, the medium drive 110 includes multiple read channels. In an example, the pick-up unit 111 includes a quadrant photo detector (not shown) configured to generate a first electrical signal that is a data signal corresponding to data stored on a wobbled track of the storage medium 111, and a second electrical signal that is a wobble signal corresponding to the wobble of the track. The medium drive 110 includes a first read channel to read the data signal, and a second read channel to read the wobble signal. In an embodiment, any read channel can be individually configured according to the read channel 120. In another embodiment, the two read channels share, for example, the storage circuit 121 and the logic control circuit 122. Thus, the logic control circuit 122 receives signals from both read channels, and generates the control signals to control the operations of the storage circuit 121 to store and recover processing parameters in both read channels.

For ease and clarity of description, the embodiments are presented with the bus architecture 108. However, it should be understood that any other architectures can be used to couple components within the electronic system 100.

Figure 2:
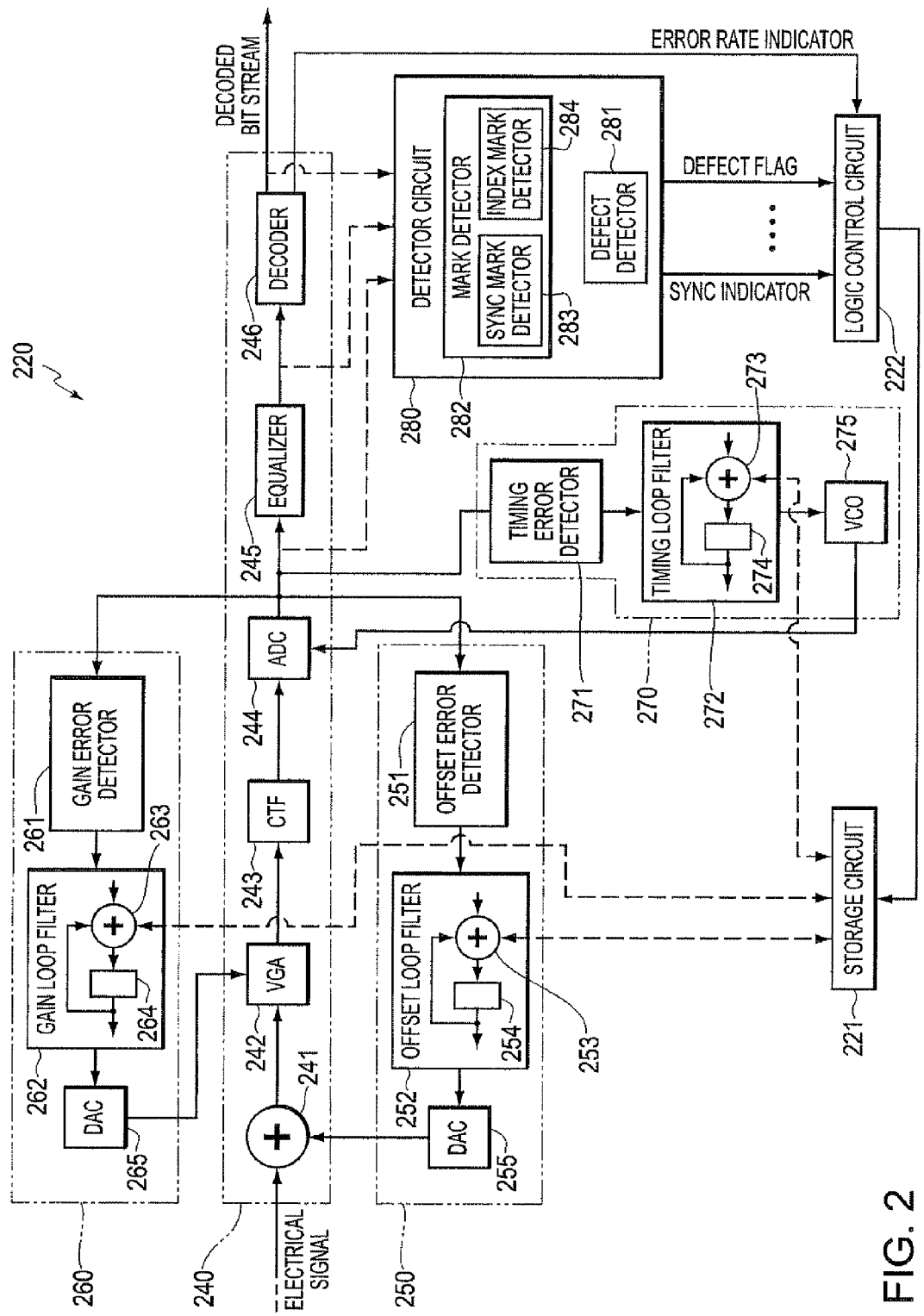
FIG. 2 shows a block diagram of a read channel example 220 according to an embodiment of the disclosure.

FIG. 2 shows a block diagram of a read channel example 220 according to an embodiment of the disclosure. The read channel 220 includes processing modules 240, an offset determination module 250, a gain determination module 260, a timing determination module 270, a detector circuit 280, a logic control circuit 222, and a storage circuit 221. These elements are coupled together as shown in FIG. 2.

The processing modules 240 receive an electrical signal, such as the electrical signal 115 in FIG. 1, and regulate the electrical signal using various signal processing techniques, such as amplification, offset adjustment, filtering, sampling, analog to digital converting, and the like. In an example, the processing modules 240 includes an offset adjustment module 241, a variable gain amplifier (VGA) 242, a continuous time filter (CTF) 243, an analog to digital converter (ADC) 244, an equalizer 245, and a decoder 246. According to an embodiment of the disclosure, the offset determination module 250, the gain determination module 260 and the timing determination module 270 determine processing parameters, such as an offset adjustment, a gain adjustment, a timing adjustment, and the like; and the processing module 240 processes the electrical signal based on the determined processing parameters.

Specifically, the offset adjustment module 241 receives the electrical signal, combines an offset adjustment with the electrical signal to adjust an offset of the electrical signal, and provides the offset-adjusted electrical signal to the VGA 242. The VGA 242 amplifies the electrical signal with a gain that is adjustable, and provides the amplified electrical signal to the CTF 243. The CTF 243 filters the amplified electrical signal to remove high frequency noise to clean the electrical signal, and provides the filtered electrical signal to ADC 244. The ADC 244 samples the electrical signal according to sampling clock, converts the samples of the electrical signal from an analog form to a digital form, and provides digital signal to the equalizer 245.

The equalizer 245 receives the digital signal, and shapes the digital signal. In an embodiment, the equalizer 245 is a finite impulse response (FIR) digital filter that is configured to shape the digital signal according to a partial response target to reduce noise from the digital signal and control inter-symbol interference.

Then, the decoder 246 extracts the bit stream from the shaped digital signal. The decoder 246 can use any suitable technique to extract the bit stream. In an embodiment, the decoder 246 includes a Viterbi detector (not shown) that makes bit decisions according to a Viterbi algorithm. Further, in an embodiment, the decoder 246 includes an error correction code (ECC) decoder (not shown) to correct decoding errors. The decoder 246 can also calculate an error rate based on the error correction. It is noted that the decoder 246 can include any suitable decoder to decode the bit stream, to correct the decoding errors, and to calculate an error rate. In an embodiment, the decoder 246 outputs an error rate indicator. For example, when the error rate is higher than a threshold, the decoder 246 outputs logic "1" as the error rate indicator; otherwise, the decoder 246 outputs logic "0" as the error rate indicator.

The offset determination module 250 provides the offset adjustment to the offset adjustment module 241 to adjust the offset of the electrical signal. In an example, the offset determination module 250 is coupled to the processing modules 240 to form an offset control loop. In the FIG. 2 example, the offset determination module 250 includes an offset error detector 251, an offset loop filter 252, and a digital to analog converter (DAC) 255. These elements are coupled together and are coupled with the processing modules 240 to form an offset control loop as shown in FIG. 2. Specifically, the offset error detector 251 receives the digital samples output from the ADC 244, detects an offset error based on the digital samples, and provides the detected offset error to the offset loop filter 252. The offset loop filter 252 removes high frequency noise in the detected offset error to generate an offset adjustment signal. The DAC 255 converts the offset adjustment signal from a digital form to an analog form. The offset adjustment signal of the analog form is provided to the offset adjustment module 241 to adjust the offset of electrical signal.

In an embodiment, the offset loop filter 252 includes a register 254 and an accumulator 253. The accumulator 253 combines a detected offset error with a previous offset adjustment to generate a current offset adjustment, The register 254 can be configured to buffer the current offset adjustment, and hold the previous offset adjustment.

The gain determination module 260 provides a gain adjustment signal to the VGA 242 in order to adjust an amplitude of the electrical signal. Similar to the offset determination module 250, in an example, the gain determination module 260 is coupled with the processing modules 240 to form a gain control loop. In the FIG. 2 example, the gain determination module 260 includes a gain error detector 261, a gain loop filter 262, and a DAC 265. These elements are coupled together and are coupled with the processing modules 240 to form a gain control loop as shown in FIG. 2. Specifically, the gain error detector 261 receives the digital samples output from the ADC 244, detects a gain error based on the digital samples, and provides the detected gain error to the gain loop filter 262. The gain loop filter 262 removes high frequency noise to generate a gain adjustment signal. The DAC 265 converts the gain adjustment signal from a digital form to an analog form, and provides the gain adjustment signal to the VGA 242 to adjust the gain of the VGA 242.

In an embodiment, the gain loop filter 262 includes a register 264 and an accumulator 263. The accumulator 263 combines a detected gain error with a previous gain adjustment to generate a current gain adjustment. The register 264 can be configured to buffer the current gain adjustment, and hold the previous gain adjustment.

The timing determination module 270 provides a sampling clock to the ADC 244 to sample the electrical signal at appropriate timing. Similar to the offset determination module 250 and the gain determination module 260, in an example, the timing determination module 270 is coupled with the processing modules 240 to form a timing control loop. In the FIG. 2 example, the timing determination module 270 includes a timing error detector 271, a timing loop filter 272, and a VCO 275. These elements are coupled together and are coupled with the processing modules 240 to form a gain control loop as shown in FIG. 2. Specifically, the timing error detector 271 receives the digital samples output from the ADC 244, detects a timing error based on the digital samples, and provides the detected timing error to the timing loop filter 272. The timing loop filter 272 removes high frequency noise to generate a timing adjustment signal. The VCO 275 adjusts the sampling clock based on the timing adjustment signal.

In an embodiment, the timing loop filter 272 includes a register 274 and an accumulator 273. The accumulator 273 combines a detected timing error with a previous timing adjustment to generate a current timing adjustment. The register 274 can be configured to buffer the current timing adjustment, and hold the previous timing adjustment.

The detector circuit 280 can include various suitable detector circuits to detect suitable parameters from the electrical signal 115 during processing, for example, the processed signals output from various processing modules 241-246. In an embodiment, the detector circuit 280 includes a mark detector 282 to detect specific marks.

It is noted that, in an embodiment, a storage medium stores user data in a bit stream that uses synchronization (sync) marks having a predetermined unique pattern, such as a run-length-limited (RLL) constrained pattern, and the like, to frame user data. For example, Blu-ray disc uses a 9T9T pattern having nine zeroes followed by nine ones or nine ones followed by nine zeros in each sync frame, for example, every 1932 channel bits; DVD disc uses a 14T pattern having fourteen zeros or fourteen ones in each sync frame, for example, every 1488 channel bits; CD disc uses a 11T11T pattern having eleven zeroes followed by eleven ones or eleven ones followed by eleven zeros in each sync frame, for example 588 channel bits. In an example, the mark detector 282 includes a sync mark detector 283 configured to detect the sync marks. When the sync mark detector 283 detects a frame sync mark, and the frame sync mark exactly matches a reference frame sync mark, the detector circuit 280 outputs logic "1" as a sync indicator; otherwise, the detector circuit 280 outputs logic "0" as the sync indicator.

It is also noted that, in an embodiment, a track on a storage medium is divided into a plurality of sectors. Each sector can store multiple data frames. In an example, the sync mark detector 283 is configured to detect sector sync marks. When the sync mark detector 283 detects a sector sync mark, and the sector sync mark exactly matches a reference sector sync mark, the detector circuit 280 outputs logic "1" as a sync indicator; otherwise, the detector circuit 280 outputs logic "0" as the sync indicator. Further, in an example, when the sync mark detector 283 detects a sector sync mark, the sector sync mark exactly matches a reference sector sync mark, and the sector sync identification is correct, the detector circuit 280 outputs logic "1" as a sync indicator; otherwise, the detector circuit 280 outputs logic "0" as the sync indicator.

It is noted that, in another embodiment, a storage medium includes index marks at evenly spaced angles in a revolution, such as every ¼/π. In an example, the mark detector 282 includes an index mark detector 284 configured to detect the index marks. In another example, the storage medium does not include physical index marks, however, the hardware that reads the storage medium generates the index marks in the electrical signal. When the index mark detector 284 detects an index mark, the detector circuit 280 outputs logic "1" as an index mark indicator (not shown); otherwise, the detector circuit 280 outputs logic "0" as the index mark indicator.

Further, in an example, the detector circuit 280 includes a defect detector 281. the detect detector 281 detects defects from the electrical signal 115 during processing, for example, the partially processed signals output from various processing modules 241-246 or the decoded bit stream. It is noted that the defect detector 281 can use any suitable techniques, such as comparing signal amplitude to a threshold, and the like, to detect defects. In an example, when the defect detector 281 detects a hard defect, such as a scratch, that significantly disturbs the electric signal, the detector circuit 280 outputs logic "1" as the defect flag signal; otherwise, the detector circuit 280 outputs logic "0" as the defect flag signal.

The logic control circuit 222 receives various signals from the detector circuit 280 and the processing modules 240, validates the processing based on the received signals, and generates control signals to control the operation of the storage circuit 221. In an embodiment, similar to the logic control circuit 122, the logic control circuit 222 controls the storage circuit 221 to perform the sampling operation, the maintaining operation and the recovering operation.

According to an aspect of the disclosure, the logic control circuit 222 controls the storage circuit 221 to perform the sampling operation at a relatively high frequency, such as corresponding to frame sync mark interval.

In an embodiment, the logic control circuit 222 performs a validation operation to validate the processing of the electrical signal at each frame sync mark interval. In an example, the logic control circuit 222 validates the processing of the electrical signal based on the frame sync mark detection, the error rate, and the defect detection. In an example, when the sync indicator is indicative of a detection of a perfect frame sync mark, the processing is validated. In another example, when the sync indicator is indicative of a detection of a perfect frame sync mark and the error rate indicator is indicative a relatively low error rate, the processing of the electrical signal is validated. In another example, when the sync indicator is indicative of a detection of a perfect frame sync mark, the error rate indicator is indicative a relatively low error rate and the defect flag is indicative of low defect disturbance, the processing of the electrical signal is validated.

According to another aspect of the disclosure, the logic control circuit 222 controls the storage circuit 221 to perform the sampling operation at a relatively high frequency, such as corresponding to sector sync mark interval.

In an embodiment, the logic control circuit 222 performs a validation operation to validate the processing of the electrical signal at each sector sync interval. In an example, when the sync indicator is indicative of a detection of a perfect sector sync mark, the processing of the electrical signal is validated. In another example, when the sync indicator is indicative of a detection of a perfect sector sync mark and the error rate indicator is indicative a relatively low error rate, the processing of the electrical signal is validated. In another example, when the sync indicator is indicative of a detection of a perfect sector sync mark, the error rate indicator is indicative a relatively low error rate and the defect flag is indicative of low defect disturbance, the processing of the electrical signal is validated.

According to another aspect of the disclosure, the logic control circuit 222 controls the storage circuit 221 to perform the sampling operation at a relatively high frequency, such as corresponding to angle index interval.

In an embodiment, the logic control circuit 222 performs a validation operation to validate the processing of the electrical signal at each angle index interval. In an example, when an angle index is detected and the error rate indicator is indicative of a low error rate, the processing of the electrical signal is validated.

When the processing of the electrical signal is validated, the logic control circuit 222 provides control signals to the storage circuit 221 to perform the sampling operation. In an embodiment, the storage circuit 221 samples the accumulators 253, 263 and 273, and stores the sampled values. It is noted that accumulator values for other internal signals in the read channel 220 might also be sampled and stored based on control from the same logic control circuit 222. It is noted that the storage circuit 221 may sample other circuit components in the control loops, such as the registers 254, 264 and 274, and the like. When the process fails the validation, the logic control circuit 222 provides control signals to the storage circuit 221 to perform maintaining operation to maintain the stored values.

Further, in an embodiment, the logic control circuit 222 provides control signals to the storage circuit 221 to control the storage circuit 221 to perform recovering operation. In an example, when the detect flag is indicative of an end of a defect, such as switching from "1" to "0", the logic control circuit 222 controls the storage circuit 221 to perform the recovering operation. In an example, the storage circuit 221 overwrites the register 254, 264 and 274 with the stored values.

According to an aspect of the disclosure, the recovering operation of the storage circuit 221 enables the control loops to recover and relock to the electrical signal at an end of a hard defect, such as a scratch defect, much faster than the adaptively relocking by the control loops. Thus, the performance for recovering from hard defects does not strongly depend on the loop gain. Then, in an embodiment, the control loops are configured to have relatively large loop gains to increase the tracking ability for the control loops to track the fast variation of the channel data. The relatively large loop gain increases the performance in the presence of soft defects, such as fingerprint and dirt smudges.

It is noted that, in an example, the processing modules 240 includes other circuits (not shown) to control/correct other signal properties of the electrical signal. The other circuits can be configured in a similar manner as the offset control, the gain control and the timing control in FIG. 2.

Figure 3:
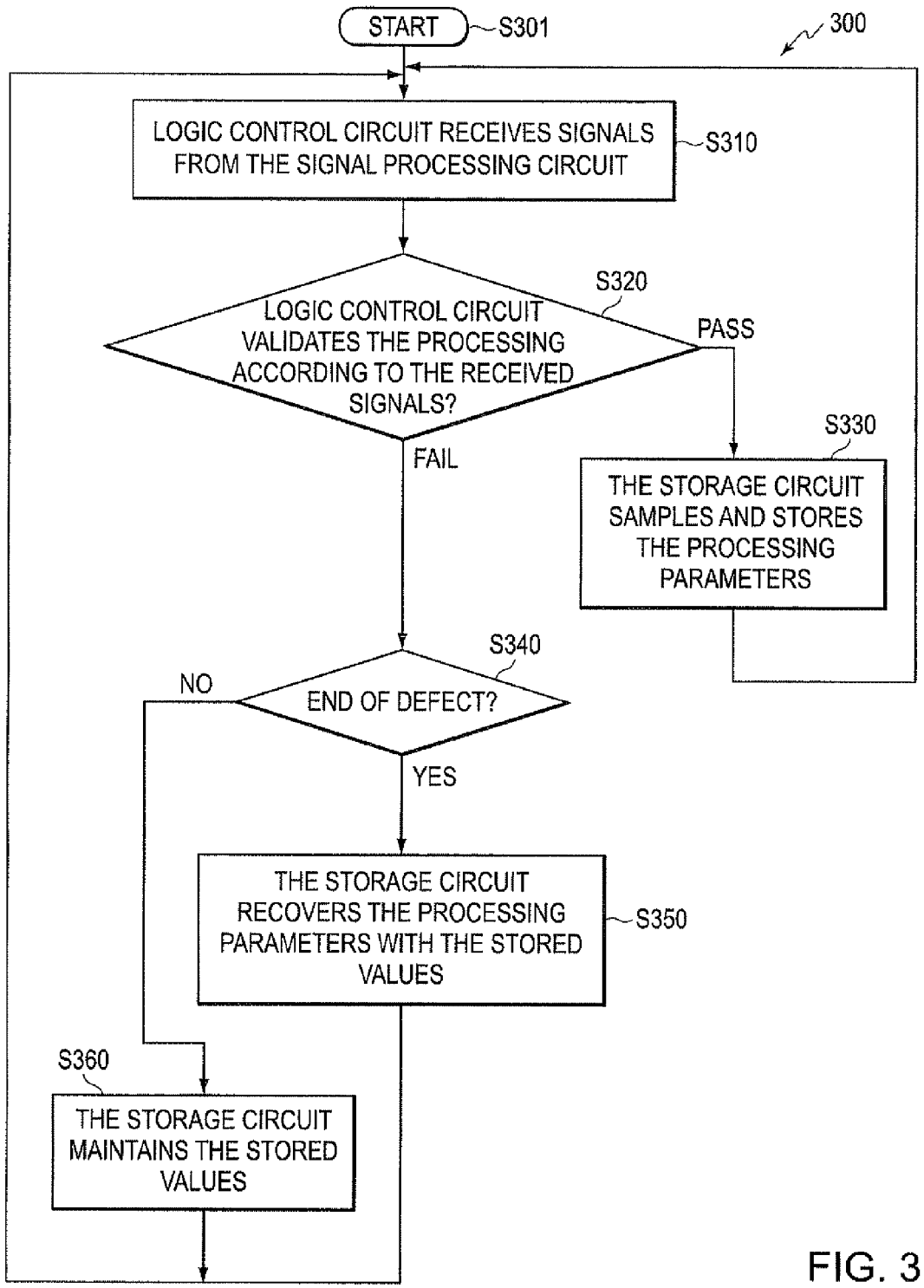
FIG. 3 shows a flow chart outlining a process example 300 according to an embodiment of the disclosure.

FIG. 3 shows a flow chart outlining a process example 300 for the logic control circuit 222 to control the storage circuit 221 according to an embodiment of the disclosure. The process starts at S301 and proceeds to S310.

At S310, the logic control circuit 222 receives signals from the signal processing circuit, such as the processing modules 240, the detector circuit 280, and the like, that processes the electrical signal. In an example, the logic control circuit 222 receives the sync indicator, the defect flag, the error rate indicator and the like.

At S320, the logic control circuit 222 validates the processing of the electrical signal according to the received signals. When the processing passes the validation, the process proceeds to S330; when the processing fails the validation, the process proceeds to S340.

At S330, the logic control circuit 222 controls the storage circuit 221 to perform a sampling operation. The storage circuit 221 samples the processing parameters, such as the offset adjustment, the gain adjustment and the timing adjustment, and stores the sampled values. For example, the storage circuit 221 samples the accumulators 253, 263 and 273 and stores the sampled values. Then the process returns to S310.

At S340, the logic control circuit 222 determines whether an end of defect is detected. For example, when the defect flag switches from "1" to "0", an end of defect is detected. When the end of defect is detected, the process proceeds to S350; otherwise the process proceeds to S360.

At S350, the logic control circuit 222 controls the storage circuit 221 to perform a recovering operation. For example, the storage circuit 221 overwrites the registers 254, 264 and 274 with the stored values. Then the process returns to S310.

At S360, the logic control circuit 222 controls the storage circuit 221 to maintain the stored values. Then the process returns to S310.

It is noted that various circuit techniques can be used to implement the process 300, and the process 300 can be suitably modified to suit for circuit implementation.

Figure 4:
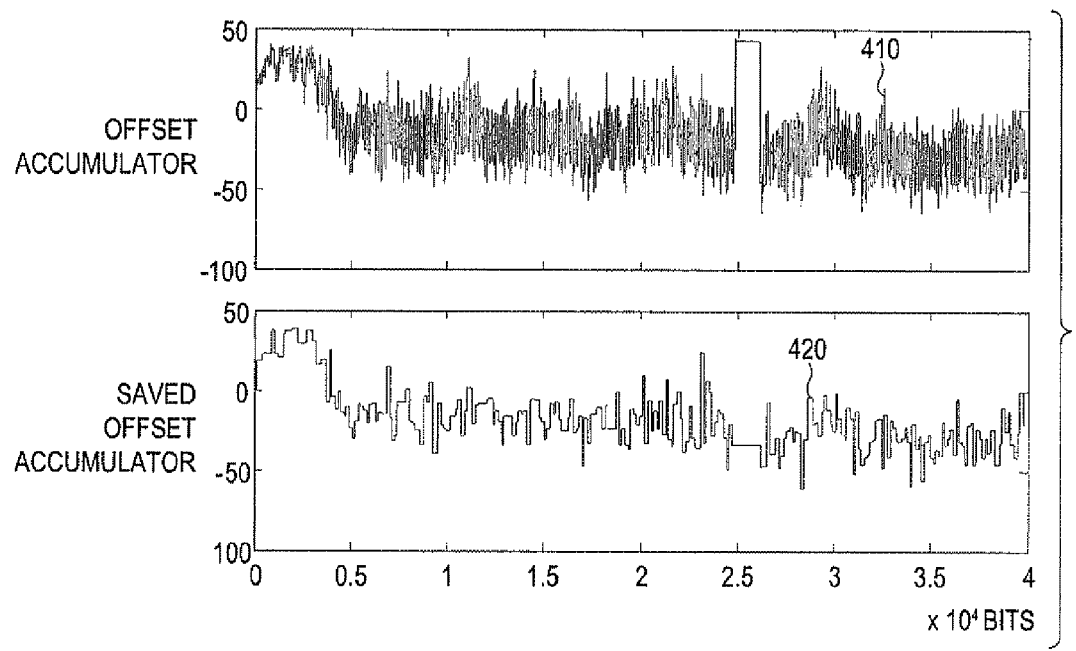
FIG. 4 shows a plot 400 of waveforms according to an embodiment of the disclosure.

FIG. 4 shows a plot 400 of waveforms during a read operation. The plot 400 includes a first curve 410 showing values in an offset accumulator, such as the accumulator 253 that determines the offset adjustment (one of the processing parameters) to the processing modules 240, a second curve 420 showing saved values of the offset accumulator in the storage circuit 221 during the read operation. The X axis corresponds to channel bits.

As seen by the first curve 410, the offset adjustment is adaptively adjusted. In an example, once an average offset value is found in general, the offset adjustment is adaptively adjusted around that value. Any large deviations from such a value are most likely the result of a defect or distortion in the signal.

As seen by the second curve 420, the storage circuit 221 is controlled to sample the offset accumulator 253 by a frequency corresponding to frame sync mark interval, and stores the sampled values.

However, a defect disturbs the processing at around channel bit 25000, and causes the offset loop to lose lock to the electrical signal. The defect disturbance is detected, for example, according to signals in the processing modules 240 and the detector circuit 280. When the defect disturbance is detected, the storage circuit 221 maintains the values of the offset accumulator last sampled and stored.

Further, when the defect is passed around the channel bit 26000, the offset loop adaptively relocks to the electrical signal.

Figure 5:
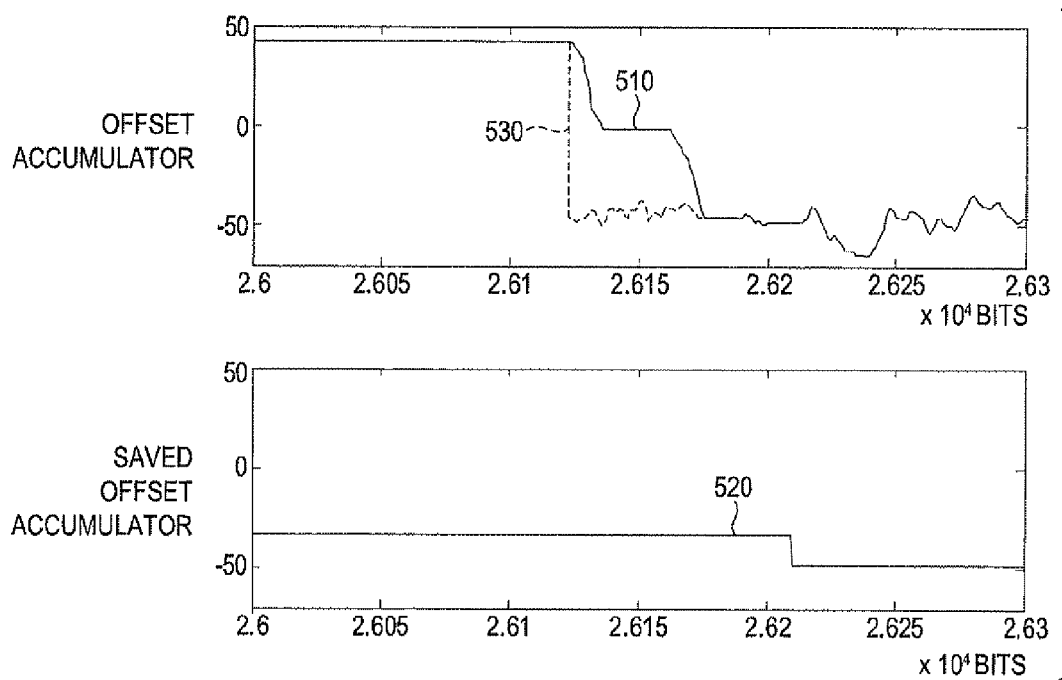
FIG. 5 shows a plot 500 that details a portion of the plot 400.

FIG. 5 shows a plot 500 that details the portion of the plot 400 around the channel bit 26000. The plot 500 includes a first curve 510 corresponding to the first curve 410 in FIG. 4 and a second curve 520 corresponding to the second curve 420 in FIG. 4.

As seen by the first curve 510, the defect is gone about channel bit 26120. But it takes over one hundred channel bits for the offset loop to relock to the electrical signal around channel bit 26220. According to an embodiment of the disclosure, when an end of defect is detected, for example, by the defect detector, at around channel bit 26120, the storage circuit 221 is controlled to perform a recovering operation to recover the offset adjustment using the stored values. Then, the offset control loop relocks to the electrical signal in a relatively short time, as shown by the dashed portion 530 in FIG. 5.

While the subject matter of the present disclosure has been described in conjunction with the specific embodiments thereof that are proposed as examples, it is evident that many alternatives, modifications, and variations will be apparent to those skilled in the art. Accordingly, embodiments of the present disclosure as set forth herein are intended to be illustrative, not limiting. There are changes that may be made without departing from the scope of the present disclosure.

What is claimed is:

1. A signal processing circuit, comprising:
   a plurality of processing-circuit modules configured to process an electrical signal, the plurality of processing-circuit modules having at least one processing parameter that is adaptively adjusted based on the electrical signal; and
   a logic control circuit configured to receive signals from the plurality of processing-circuit modules, validate the processing of the electrical signal based on the received signals, and control a storage circuit to sample and store a value of the processing parameter when the processing is validated.

2. The signal processing circuit of claim 1, wherein the logic control circuit is configured to control the storage circuit to maintain the value of the processing parameter when the processing fails validation, and to control the storage circuit to restore the processing parameter in the plurality of processing-circuit modules to the stored value when the plurality of processing-circuit modules is disturbed by a defect.

3. The signal processing circuit of claim 1, wherein the logic control circuit is configured to control the storage circuit to sample the processing parameter at a frequency that is higher than a threshold when the processing is validated.

4. The signal processing circuit of claim 3, wherein the logic control circuit is configured to control the storage circuit to sample the processing parameter at each frame sync interval when the processing is validated.

5. The signal processing circuit of claim 4, wherein the logic control circuit is configured to validate the processing based on at least one of a signal indicative of frame sync mark detection, a signal indicative of an error rate of the plurality of processing-circuit modules and a signal indicative of defect detection.

6. The signal processing circuit of claim 3, wherein the logic control circuit is configured to control the storage circuit to sample the processing parameter at each sector sync interval when the processing is validated.

7. The signal processing circuit of claim 6, wherein the logic control circuit is configured to validate the processing based on at least one of a signal indicative of sector sync mark detection, a signal indicative of sector sync mark identification detection, a signal indicative of an error rate of the plurality of processing-circuit modules and a signal indicative of defect detection.

8. The signal processing circuit of claim 3, wherein the logic control circuit is configured to control the storage circuit to sample the processing parameter at an angle index interval when the processing status is validated.

9. The signal processing circuit of claim 8, wherein the logic control circuit is configured to validate the processing based on a signal indicative of an error rate of the plurality of processing-circuit modules.

10. The signal processing circuit of claim 1, wherein the plurality of processing-circuit modules further comprises:
    a control loop configured to adjust the processing parameter to control an attribute of the processed electrical signal.

11. The signal processing circuit of claim 10, wherein the logic control circuit is configured to control the storage circuit to sample an accumulator of the control loop when the processing is validated.

12. The signal processing circuit of claim 1, wherein the plurality of processing-circuit modules comprises at least one of:
   an offset loop configured to adjust an offset adjustment to control an offset of the processed electrical signal;
   a gain loop configured to adjust a gain for amplifying the electrical signal to control an amplitude of the processed electrical signal; and
   a timing loop configured to adjust a sampling clock to control timing of the sampled electrical signal.

13. The signal processing circuit of claim 1, wherein the electrical signal is generated in response to reading data on a storage medium.

14. A method for signal processing, comprising:
   receiving signals generated during processing of an electrical signal by a signal processing device;
   validating the processing based on the received signals;
   sampling a processing parameter that is adaptively adjusted based on the electrical signal when the processing is validated; and
   storing the sampled value of the processing parameter.

15. The method of claim 14, further comprising:
   maintaining the stored value when the processing is not validated; and
   restoring the processing parameter to the stored value when a defect is detected.

16. The method of claim 14, wherein sampling the processing parameter that is adaptively adjusted based on the electrical signal when the processing is validated further comprises:
   sampling the processing parameter at a frequency that is higher than a threshold when the processing is validated.

17. The method of claim 14, wherein sampling the processing parameter that is adaptively adjusted based on the electrical signal when the processing is validated further comprises:
   validating the processing based on at least one of a signal indicative of frame sync mark detection, a signal indicative of an error rate of the processing and a signal indicative of defect detection; and
   sampling the processing parameter at each frame sync interval when the processing is validated.

18. The method of claim 14, wherein sampling the processing parameter that is adaptively adjusted based on the electrical signal when the processing is validated further comprises:
   validating the processing based on at least one of a signal indicative of sector sync mark detection, a signal indicative of sector sync mark identification detection, a signal indicative of an error rate of the processing and a signal indicative of defect detection; and
   sampling the processing parameter at each sector sync interval when the processing is validated.

19. The method of claim 14, wherein sampling the processing parameter that is adaptively adjusted based on the electrical signal when the processing is validated further comprises:
   validating the processing based a signal indicative of an error rate of the processing; and
   sampling the processing parameter at angle index interval when the processing is validated.

20. The method of claim 14, wherein sampling the processing parameter that is adaptively adjusted based on the electrical signal when the processing is validated further comprises:
   sampling an accumulator in a control loop that adjusts the processing parameter to control an attribute of the processed electrical signal.

21. The method of claim 20, wherein sampling the accumulator in the control loop that adjusts the processing parameter to control the attribute of the processed electrical signal comprises at least one of:
   sampling an accumulator in an offset loop that adjusts an offset adjustment to control an offset of the processed electrical signal;
   sampling an accumulator in a gain loop that adjusts a gain for amplifying the electrical signal to control an amplitude of the processed electrical signal; and
   sampling an accumulator in a timing loop that adjusts a sampling clock to control timing of the sampled electrical signal.

* * * * *